July 2, 1929.  W. T. FERGUSON  1,719,695
FISHING ROD SUPPORT
Filed Aug. 24, 1926
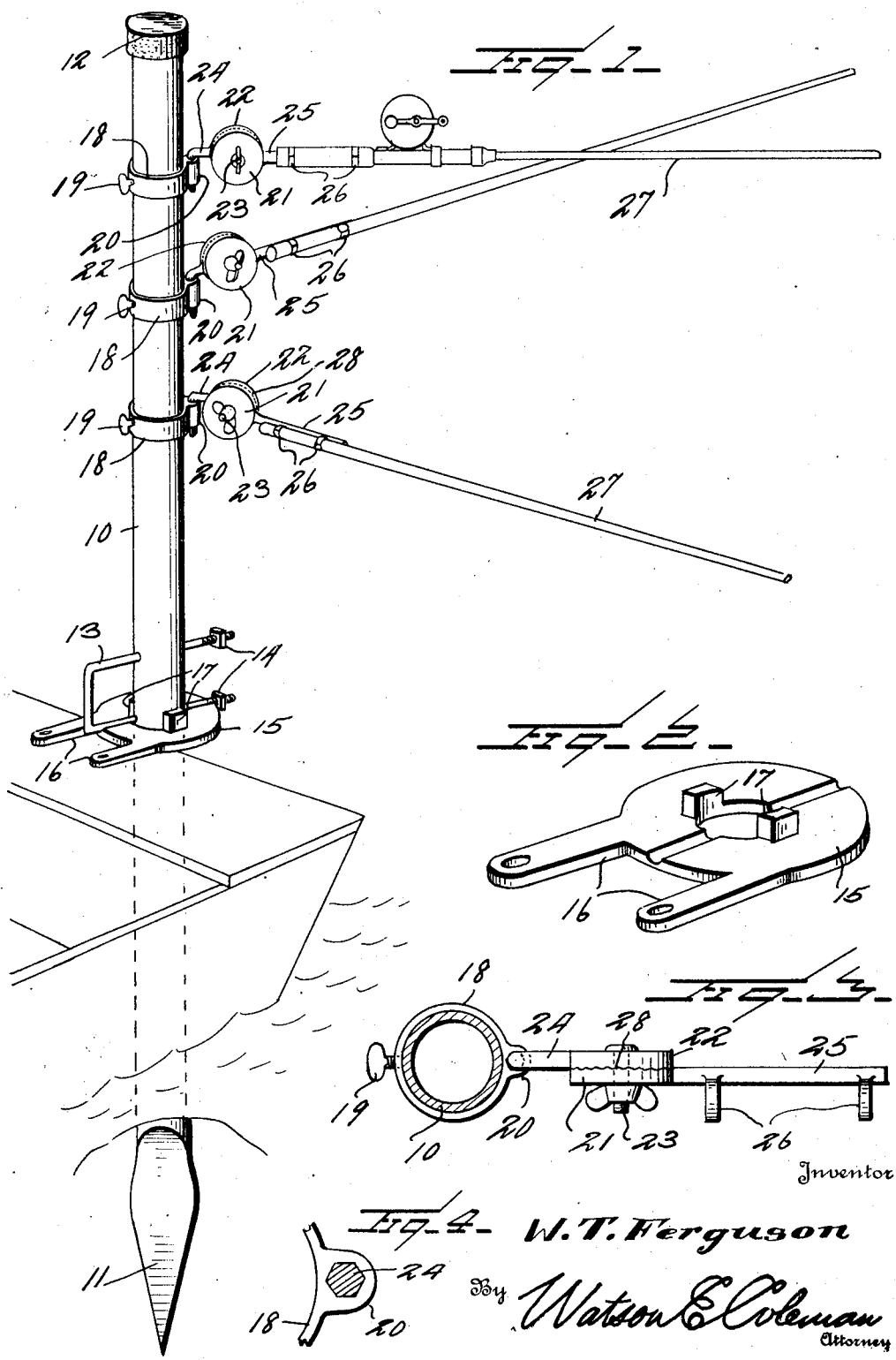

Patented July 2, 1929.

1,719,695

UNITED STATES PATENT OFFICE.

WILLIAM T. FERGUSON, OF BIRDS, ILLINOIS, ASSIGNOR OF ONE-HALF TO OMER LEWIS CUNNINGHAM, OF LAWRENCEVILLE, ILLINOIS.

FISHING-ROD SUPPORT.

Application filed August 24, 1926. Serial No. 131,278.

This invention relates to devices for supporting fishing rods and the general object of the invention is to provide a support of this character which is so constructed that it may be forced into the ground, mounted upon a boat or mounted upon the planking of a wharf, for instance.

Another object is to provide a device of this character adapted to support a plurality of rods and to hold these rods securely in any desired adjusted position.

Other objects will appear in the course of the following description.

My invention is illustrated in the accompanying drawings wherein:—

Figure 1 is a perspective view of my fishing pole support illustrated as applied to a boat;

Fig. 2 is a perspective view of the supporting disk 15;

Fig. 3 is a sectional view through the supporting pipe and the pole support;

Figure 4 is a detailed view showing the collar 18 and the tang of the fishing rod holder in section.

Referring to these drawings 10 designates a metallic pipe whose lower portion is flattened and pointed as at 11, so that it may be driven into the ground. The upper portion of the pipe is formed as at 12, so as to constitute a screw cap whereby it may be driven into the ground.

Extending through the pipe 10 are the arms of a U-shaped handle 13. These arms beyond the pipe are screw-threaded for the reception of nuts 14 and this permits the extremities of these arms to pass through a plank and be bolted thereto. Thus, the pipe may be supported upon the planking of a wharf or any other desired position and the pipe held from twisting.

Disposed below the handle is a disk or washer-like plate 15 having two lugs 16 which are perforated for the passage of screws so that these lugs may rest flat upon the thwart of a boat or string piece of the wharf and be attached thereto by screws passing through these perforations. This disk 15 is formed with a shoulder piece 17 which extends up and engages the pipe to keep the pipe or stake, as it may be called from turning. The disk 15 has two grooves disposed on opposite sides of its central aperture within which the lower arm of the handle 13 rests to keep the stake or pipe from twisting.

For the purpose of supporting a fishing pole or rod upon the stake or pipe, I provide a construction which is illustrated, described and claimed in my pending application for patent, Serial No. 170,597, filed February 24, 1927, this structure including a collar 18 slipped upon the stake and by means of the thumb screw 19 or equivalent device, held in any adjusted position upon the stake. This collar is formed with a hexagonal socket 20 opposite the thumb screw. The fishing rod support or pole support consists of two disk-like sections 21 and 22 opposed to each other and through which a bolt 23 passes. This bolt may be in the form of a thumbscrew or any equivalent member. The disk 22 has an outwardly projecting angular shank 24 adapted to engage non-rotatively in the socket 20, while the disk 21 has an outwardly projecting arm 25 formed with U-shaped clips 26 within which the fishing rod or pole 27 is adapted to be supported. The confronting faces of the disks 21 and 22 are formed with intermeshing teeth 28 and thus if it be desired to angularly adjust the rod 27, the thumb screw or bolt 23 is loosened, the disks are shifted apart so as to disengage the teeth or permit the teeth to slip over each other, the arm 25 is angularly adjusted and then the thumb screw or bolt tightened up. The collar 18 may be shifted up or down upon the stake 10 or shifted around the stake to any desired position and the pole or rod supporting arm 25 may be shifted up or down to any desired angular position and thus the fishing rod may be supported just as desired by the fisherman. Obviously the clips 26 will vary in size so as to support rods or poles having relatively large butts or relatively small butts and rods with reels may be supported just as readily as rods or poles without reels.

It will be seen from Figure 1 that a plurality of rods may be supported upon the stake in various angular positions so that lines may be cast in any desired direction. The disk 15 not only constitutes means whereby the stake may be supported upon a boat, wharf or plank, but also means to prevent the stake from being driven too far down into the earth and prevents the handle from becoming dirty. As the lower portion of the pipe or stake is relatively wide and flat, the stake will be prevented from twisting or turning and the flat disk 15 will act to prevent the stake from tipping when inserted in the ground and also prevent the stake from turning relative to the disk when the disk is attached to the thwart of a boat, the deck plank thereof, or to the wharf.

I claim:—

A support for fishing rods including a stake, a collar surrounding the stake and adjustable rotatably around the same and vertically upon the stake, means for clamping the collar in adjusted position, said collar having a socket, and fishing pole engaging means comprising two opposed disks disposed in planes parallel to the longitudinal axis of the stake, both of said disks having toothed confronting faces, one of said disks having an arm provided with clips for engaging the butt of a fishing pole, the other disk being provided with an angular pin insertible into said socket for rotation in a horizontal plane, and means passing through both disks whereby the disks may be clamped in relatively adjusted relation the axis of the arm and pole held by the arm being parallel and substantially continuous, said axis of the arm and pole intersecting at right angles the axis of the clamping means.

In testimony whereof I hereunto affix my signature.

WILLIAM T. FERGUSON.